UNITED STATES PATENT OFFICE 2,591,149

METHOD OF COATING MINERAL GRANULES

Clinton Grove, Basking Ridge, N. J., assignor to Central Commercial Company, Cook County, Ill., a corporation of Illinois No Drawing. Application April 21, 1948, Serial No. 22,493

3 Claims. (Cl. 117—100)

This invention relates to granulated color-coated mineral granules and mineral surfaced roofing, such as sheets and shingles of bituminously impregnated and coated fabric such as paper felt, to the coated side of which the color coated granules are embedded and firmly attached.

The invention relates more particularly to inorganic bonds or binders employing sodium silicate for permanently attaching pigmenting material to the surface of the granules. Methods of the prior art employing silicate bonds or binders either depend upon high temperatures to insolubilize the silicate or upon reactants in such quantity, or of such a nature that the cost of producing the granules has been excessive. Such methods also require subsequent treatment of the granules to provide satisfactory adhesion of the granules to the asphalt or other organic plastic upon the sheet or shingle mineralized with said granules, thus adding further to their cost of production. High temperatures referred to herein shall be construed to mean temperatures below the fusion point of the silicate, such as for example, temperatures in the range of 850° F. to 1800° F., the use of which is known to have detrimental effect on the pigment and to result in loss of color.

An essential object of the invention is the provision of a simple, low heat treatment of mineral granules to form on the surface of each separate granule an insoluble color bearing coat consisting of the reaction product of relatively inexpensive materials, thereby making for greater economy in the production of color coated granules and with assurance that there shall be no loss of color in the processing.

Another object is the provision of a color coated granule which is free from efflorescence or bloom.

A still further object is the provision of a mineral granule, the coating on the surface of which has satisfactory adhesion to asphalt.

A still further object is the provision of a mineral granule, the color coating of which is permanent and weather resistant and is highly attractive in that the pigmenting material has suffered no loss of color in the processing.

A still further object is the provision of a method of color coating granules which enables a wide choice of base granule materials and similarly, a wide choice of pigmenting materials, due to the fact that by the absence of high temperatures the pigmenting material is not injured in the processing, nor do the constituent elements of the base granule material set up unwanted reaction with the materials comprising my improved color bearing bond or binder.

I have discovered that by color coating mineral granules with a color-bearing bond comprising sodium silicate and a selected reactant in a quantity less than that required to react completely with the silicate, then heating the granules to a temperature of 450° F. to 650° F. to partially react the reactant with the silicate, and finally treating the granules with an insolubilizing agent which reacts with the coating at a temperature below the boiling point of water; an insoluble color bearing coating is formed in which the pigment is permanently attached to the surface of each individual granule, which said coating is free from efflorescence, has an organophilic surface as is required for good adhesion with asphalt, and is of a highly attractive order in that there has been no loss of color in the processing.

In carrying the invention into practice, a binder is formed of sodium silicate, a reactant such as cryolite or aluminum fluoride in an amount which is less than that required to react completely with the sodium silicate during heat treatment of the granules. The sodium silicate may be any of the several commercial grades. That which is most commonly employed is the product having a ratio of $SiO_2$ to $Na_2O$ of 3.22 to 1. Other grades may be used with satisfactory results. A coating consisting of these materials is applied to 2000 lbs. of granules in the following proportions:

|  | Pounds |
| --- | --- |
| Sodium silicate solution | 60 |
| Cryolite | 4 |
| Iron oxide red | 20 |
| Water | 20 |

Mixing of the binder with the granules can be by any well known method that will insure completely covering each individual granule therewith.

The granules are then dried and heated to a temperature of 450° F. to 650° F. in a rotary kiln.

Upon being discharged from the kiln the granules are cooled to 200° F. and treated with 10 lbs. of aluminum chloride ($AlCl_3.6H_2O$) in 35 lbs. of water, and finally aerated to evaporate the water.

It has been found that silicate having an $SiO_2$ to $Na_2O$ ratio of 2 to 1 will produce a satisfactory product when a somewhat greater amount of aluminum chloride is used. It is also possible to replace aluminum chloride with other salts of a similar nature such as aluminum nitrate, ferric chloride, magnesium chloride, or other similar salts or with acids such as hydrochloric or nitric as may be dictated by economic considerations or by the effect upon the coloring of the resulting granule.

Because of the relatively small amount of reactant used in the composition of the coating before heating and the relatively low cost of aluminum chloride solution used for the final treatment, granules may be produced by this process more economically than by methods of the prior art.

From the above, it will be noted that the herein disclosed low heat method of color coating mineral granules comprises but a very few and exceedingly simplified steps, which are:

(1) Wetting the granules with an aqueous dispersion comprising sodium silicate, pigmenting material and a reactant in a quantity which is less than that required to react completely with the sodium silicate so that only a partial reaction is obtained by the action of heating at a low temperature, which partial reaction is sufficient to gel the silicate to a film which resists abrasion and prevents pigment loss during further processing.

(2) Heating the granules at a temperature of 450° F. to 650° F. to react the reactant with the sodium silicate.

(3) Treating the granules preferably but not necessarily during cooling thereof with an insolubilizing agent such as a solution of any one of the aforementioned salts or their equivalent or with any of the aforementioned acids or their equivalent to completely set and insolubilize the coating.

(4) Evaporating the water from the granules.

I am familiar with the results following various attempts by others to form on mineral surfacing granules of quartzite or similar materials a weather resistant coating comprising the reaction product of an aqueous solution of soluble silicates and aluminferous materials such as kayolin, feldspar or cryolite or materials containing a metallic fluoride and aluminum oxide, which product is the resultant of a high heat treatment of the granules at temperatures in a range from 850° F. to 1800° F. or above the dehydration point of the silicate and below the fusion point of the base granule. The intended purpose of such processes is the production of a surface coating on the base granule which will be characterized by a non-fused or non-glazed, insoluble, non-blooming, color-bearing coating, without causing decomposition of the base granule or any chemical reaction between the color pigment and the materials of the coating that would result in a product per se lacking in those properties necessary for a structurally strong, commercially satisfactory granule. Said processes are frequently lacking in certain essential advantages in that they limit the pigments which may be employed to those which resist high temperatures and are less economical because of greater fuel consumption.

To the best of my knowledge, no one has ever before, by the means herein provided, formed on the surface of a mineral base granule material at a temperature not above 650° F., an insoluble, non-blooming, weather resistant coating having, in addition to these properties an inherent affinity for asphalt, thereby insuring satisfactory adhesion of the granule to the structural sheet mineralized therewith. I particularly stress these unusual or unique properties of my improved coating and the fact that by the herein described low heat treatment, the base granule material is in nowise injured during the treatment. I stress also the herein disclosed use of small quantities of relatively inexpensive reactants, and the manner of employing same.

Another important feature of the invention is found in a complete reversal in the order of final treatment of the granules to insolubilize the coating. Instead of complete insolubilization by high temperatures within the kiln, final insolubilization is the direct resultant of chemical reactions in consequence of an application to the granules of a low cost reactant such as an aqueous solution of aluminum chloride after the granules are discharged from the kiln and are preferably but not necessarily in the process of cooling, thereby eliminating certain color pigments and uneconomic use of fuel caused by high temperature processes.

By reason of the low temperatures employed herein and the materials constituting the color attaching bond, most any of the commonly known base granule materials can be used with complete satisfaction, including refractory and vitrified minerals and materials.

While I have referred to color pigment such as red iron oxide, this shall not be construed as a limitation, as the low temperatures employed herein readily adapts the method to a large range of pigments.

What I claim as my invention, is:

1. The method of treating mineral granules to form on each individual granule an insoluble color-bearing coating which is characterized by its affinity for asphalt and possesses non-blooming properties, which method comprises completely coating each individual granule with an aqueous dispersion of sodium silicate, pigmenting material, and aluminum fluoride, the aluminum fluoride being present in an amount sufficient to partially react with said sodium silicate at temperatures ranging from 450° F. to 650° F., heating the coated granules to the temperatures aforesaid to partially react the aluminum fluoride with the sodium silicate, whereby the sodium silicate gels to a film which resists abrasion and retains the pigmenting material on the granules, cooling the coated granules to a temperature of approximately 200° F., applying to the treated granules while they are at the latter temperature an aqueous solution of an insolubilizing agent selected from the group consisting of aluminum chloride, aluminum nitrate, ferric chloride and magnesium chloride to completely insolubilize the sodium silicate, and aerating the granules so treated to evaporate the water therefrom.

2. The method of treating mineral granules as set forth in claim 1 wherein the insolubilizing agent is aluminum chloride.

3. The method of treating mineral granules to form on each individual granule an insoluble color-bearing coating which is characterized by its affinity for asphalt and possesses non-blooming properties, which consists in mixing mineral granules in the proportions of 2000 lbs. of granules and a coating composition containing 60 lbs. of sodium silicate solution; 4 lbs. of aluminum fluoride; 20 lbs. of iron oxide red; and 20 lbs of water, for completely covering the granules, heating the coated granules over a temperature range of 450° F. to 650° F. to partially react the aluminum fluoride with the sodium silicate solution whereby the sodium silicate solution gels to a film which resists abrasion and retains the iron oxide red on the granules, cooling the coated granules to a temperature of approximately 200° F., applying to the treated granules while they are at the latter temperature an aqueous solution of aluminum chloride to completely insolubilize the sodium silicate, and aerating the granules so treated to evaporate the water therefrom.

CLINTON GROVE.

REFERENCES CITED

The following references are of record in the file of this patent:

UNITED STATES PATENTS

| Number | Name | Date |
|---|---|---|
| 1,898,345 | Denning | Feb. 21, 1933 |
| 2,057,677 | Gundlach | Oct. 20, 1936 |
| 2,114,692 | Ward et al. | Apr. 19, 1938 |
| 2,142,540 | Veazey | Jan. 3, 1939 |
| 2,163,678 | Gundlach | June 27, 1939 |
| 2,168,593 | Veazey | Aug. 8, 1939 |
| 2,379,358 | Jewett | June 26, 1945 |
| 2,417,058 | Buzzell et al. | Mar. 11, 1947 |
| 2,422,927 | Reynolds | June 24, 1947 |